United States Patent
Patel et al.

(10) Patent No.: US 7,578,958 B2
(45) Date of Patent: *Aug. 25, 2009

(54) THREE-DIMENSIONAL STRUCTURED PRINTING

(75) Inventors: Ranjana C. Patel, Bishop's Stortford (GB); Richard J. Peace, Putnoe (GB); Yong Zhao, Cambridge (GB)

(73) Assignee: Huntsman Advanced Materials Americas Inc., The Woodlands, TX (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/479,303

(22) PCT Filed: May 24, 2002

(86) PCT No.: PCT/GB02/02458

§ 371 (c)(1),
(2), (4) Date: Mar. 24, 2004

(87) PCT Pub. No.: WO03/016030

PCT Pub. Date: Feb. 27, 2003

(65) Prior Publication Data

US 2004/0145088 A1 Jul. 29, 2004

(30) Foreign Application Priority Data

May 24, 2001 (GB) ................................ 0112675.4

(51) Int. Cl.
 B27N 5/00 (2006.01)
 B29C 35/08 (2006.01)
 B29C 41/02 (2006.01)

(52) U.S. Cl. ..................... 264/460; 264/113; 264/463

(58) Field of Classification Search ................. 264/113, 264/208, 401, 497, 333, 109, 463, 460; 156/384; 428/703

See application file for complete search history.

(56) References Cited

U.S. PATENT DOCUMENTS

| 4,575,330 | A |   | 3/1986  | Hall              |         |
|-----------|---|---|---------|-------------------|---------|
| 4,863,538 | A |   | 9/1989  | Deckard           |         |
| 5,059,266 | A |   | 10/1991 | Yamane et al.     |         |
| 5,088,047 | A | * | 2/1992  | Bynum             | 700/182 |
| 5,140,937 | A |   | 8/1992  | Yamane et al.     |         |
| 5,204,055 | A |   | 4/1993  | Sachs et al.      |         |
| 5,340,656 | A | * | 8/1994  | Sachs et al.      | 428/546 |
| 5,387,380 | A | * | 2/1995  | Cima et al.       | 264/69  |
| 5,726,216 | A |   | 3/1998  | Janke et al.      |         |
| 5,807,437 | A |   | 9/1998  | Sachs et al.      |         |
| 5,855,836 | A |   | 1/1999  | Leyden et al.     |         |
| 6,133,336 | A |   | 10/2000 | Popat et al.      |         |
| 6,372,173 | B1| * | 4/2002  | Peschges          | 264/401 |
| 6,375,874 | B1| * | 4/2002  | Russell et al.    | 264/28  |
| 6,379,866 | B2|   | 4/2002  | Lawton et al.     |         |
| 6,401,002 | B1| * | 6/2002  | Jang et al.       | 700/119 |
| 6,476,122 | B1| * | 11/2002 | Leyden            | 524/577 |
| 6,569,373 | B2| * | 5/2003  | Napadensky        | 264/401 |
| 6,596,224 | B1| * | 7/2003  | Sachs et al.      | 419/6   |
| 6,742,456 | B1| * | 6/2004  | Kasperchik et al. | 101/483 |
| 6,780,368 | B2| * | 8/2004  | Liu et al.        | 264/401 |
| 6,942,830 | B2| * | 9/2005  | Mulhaupt et al.   | 264/255 |
| 2001/0035597 | A1 | * | 11/2001 | Grigg et al.   | 264/401 |
| 2001/0050031 | A1 | * | 12/2001 | Bredt et al.   | 106/162.9 |
| 2002/0008333 | A1 | * | 1/2002  | Napadensky et al. | 264/401 |
| 2002/0145213 | A1 | * | 10/2002 | Liu et al.     | 264/40.1 |
| 2003/0090034 | A1 | * | 5/2003  | Mulhaupt et al.| 264/255 |
| 2005/0167872 | A1 | * | 8/2005  | Tsubaki et al. | 264/113 |

FOREIGN PATENT DOCUMENTS

| EP | 0 431 924 A2 | 6/1991 |
| EP | 0 763 417 A1 | 3/1997 |
| JP | 63-149112 A  | 6/1988 |
| WO | WO 98/09798  | 3/1998 |
| WO | WO 98/56566  | 12/1998 |
| WO | WO 01/34371  | 5/2001 |
| WO | WO 02/064354 A1 | 8/2002 |

OTHER PUBLICATIONS

Le, Hue P., "Progress and Trends in Ink-jet Printing Technology", Journal of Imaging Science and Technology, vol. 42, No. 1, Jan./Feb. 1998.*
English Language Abstract for JP 63-149112 A, Japan.

* cited by examiner

Primary Examiner—Leo B Tentoni

(57) ABSTRACT

A process for forming a three-dimensional article in sequential layers in accordance with a digital model of the article. The process comprises the steps of defining a layer of powder or liquid material, applying a liquid reagent to the layer in a pattern corresponding to the digital model, and repeating these steps to form successive layers. The powder or liquid material comprises a first reactive component and the applied liquid includes a second active component capable of reacting with the first reactive component so that the article is built up in layers. The characteristics of the layers vary across those layers and/or the properties vary from layer to layer.

36 Claims, No Drawings

THREE-DIMENSIONAL STRUCTURED PRINTING

The present invention relates to three-dimensional structured printing, more specifically, a method of forming complex 3-D objects by jet printing techniques using computer models.

The process involved in manufacturing articles or parts is undergoing a considerable streamlining of workflow, enabled by the advent of high speed desktop computing with high processing capability, versatile CAD software able to create and represent complex 3-D objects, and high speed transmission of created digital files for global distribution. Within this developing scenario, it is of growing importance to have the ability to translate the created three dimensional digital files into handleable objects which truly represent or "proof" the digital files. This is particularly so when the created objects actually have the functionality of the objects which are to be manufactured, ultimately. In this case, the created objects may be used directly as short run manufactured objects for in service use. Short run, rapid turn round manufacturing on a globally distributed basis, is a growing need, and this manufacturing process would also benefit from such methods as described herein.

"Rapid Prototyping" systems were devised several years ago to provide such capability. In particular, stereolithography has developed as a technique capable of creating high accuracy 3-D objects using layerwise digital curing of photopolymers. This has developed significantly as a pioneering technology to produce three dimensional objects using UV lasers and liquid photosensitive photopolymerisable resin mixtures from CAD files, however, the equipment is at present expensive and requires expert users.

An example of this can be found in U.S. Pat. No. 4,575,330. In this case, a digital representation of a 3-D object is taken and converted into a succession of digital laminae. A thin layer of a UV photosensitive curable liquid polymer is formed on a platform and this is cured in the desired pattern using a UV laser source directed to the appropriate positions on the liquid layer in accordance with the digital representation of the respective lamina. This is then repeated. A problem with this system is that it is restricted in the materials available and does not readily allow for multiple and complex variations in the composition of the object. An example, nevertheless, showing some ability to achieve variable properties is described for selective colourisation in the cured object, in U.S. Pat. No. 6,133,336.

Another existing technique which is in some ways similar, is the laser sintering of successive, compacted powder layers as shown in U.S. Pat. No. 4,863,538. Examples of another system can be found in U.S. Pat. Nos. 5,204,055 and 5,340,656. These describe applying a liquid to successive powder layers in order to bond the powder layers in the required pattern. In U.S. Pat. No. 5,807,437, the liquid is applied effectively using inkjet nozzles which enable variable deflection of the liquid droplets. An important focus of these systems is to bond together ceramic or highly filled powders, and to utilise the formed objects subsequently, after further processing, for moulds or pre-forms for metal composites. A drawback of those systems is that the object produced initially (before further processing) can be delicate and prone to damage. Further steps of infiltration, e.g. using curable resins or waxes, are required to fill the pores between the surface bound powders and layers, so that better final strengths are achieved.

A more recent development is the hot-melt system, described in U.S. Pat. No. 5,855,836. In this case a solid formulation is heated until it melts and is sprayed in a desired pattern on to a substrate. It then cools and solidifies, and the sequence is repeated to build a 3-D object. The formulation includes a reactive component which is finally activated to cure the object. A disadvantage here again is that the materials available are extremely limited.

A related process is described in U.S. Pat. Nos. 5,059,266 and 5,140,937 involving direct jetting of curable materials. This process requires the jetting of the entire material which forms the layer thickness ultimately and thus is likely to be slow.

It is an object of the present invention to provide a process for forming a 3-D object which does not suffer the drawbacks of the prior art systems. More specifically, the invention seeks to provide a method which can produce an object which is robust and which can have complex, varying micro and macro properties, including the possibility of embedding in situ formed or pre-formed functional patterns or objects.

According to one aspect of the invention, there is provided a process for forming a three-dimensional article in sequential cross-sectional layers in accordance with a model of the article, the process comprising the steps of: defining a layer of a first material; applying a second material in the form of a liquid reagent to the layer of first material in a pattern corresponding to the model; and repeating these steps to form successive layers; and in which the deposited layer comprises a first reactive component and the applied liquid material includes a second active component capable of either reacting with the first reactive component or facilitating the first reactive component to react with itself, whereby the article is built up in layers; and in which the characteristics of at least some of the layers vary across those layers and/or the properties vary from layer to layer.

Thus, the two reactive components react on contact to form a cured lamina in the required pattern and this is repeated to form a cured article. In contrast to the systems of, for example, U.S. Pat. Nos. 5,059,266 and 5,140,937, the present invention separates the bulk of the layer material from the jetted reaction catalysts: thus resulting in faster through put. Additionally there is self supporting of the formed object. In the previously cited art, additional supports need to be jetted for complex parts: these supports then need to be discarded.

There are two types of the deposited layer: powder type, and liquid or paste type.

The first material may be a powder which preferably substantially comprises the first reactive component. The powder may also be a physical mixture of reactive powders, which may have different particle size distributions. Preferably, the applied liquid reagent additionally comprises a viscosity lowering diluent. It is very important in the most preferred case that the diluent in the applied liquid is a reactive diluent, so that the whole of the applied liquid is incorporated with powder to form a seamless composite of the applied liquid and powder.

The reaction may be in the form of initial swelling and tackification of the powder particles and ingress of the liquid into the powder, followed by chemical reaction between the dissolving powder and the liquid, and within the liquid itself. In this process the composite formed is void free and transparent/translucent.

It has been found that the system according to the invention can allow the formed article to be relatively robust since the reactive powder and the liquid react chemically to form a new chemical component. Chemical bonds can also form between layers and so there may be no dependence on the mechanical bonding relied upon in the prior art systems.

The effect of the diluent is twofold. Firstly, the lowering of the viscosity enables the liquid to be jetted out of smaller bore nozzles, without the need to revise the temperature to very high values (e.g. above 120° C.), thereby achieving a superior resolution. Secondly, it improves penetration of the liquid into the body of the powder, thereby achieving a more homogeneous distribution of the reactants while also enabling rapid aggregation of the powder improving resolution and further allowing the reactive liquid present in the jet liquid to react firmly with the surface of and interior of the powder. Reactive diluents are preferred as these enter into the reaction and the formed object ultimately has low volatiles content.

The powder layers may all be of the same formulation, however, different materials can be used for different layers, or even in the same layer.

Preferably, the powder comprises reactive organic or organometallic polymers, oligomers or monomers and the liquid reagent comprises a curable resin. The powder may also contain an organic or inorganic filler, a pigment, nanoparticles, a dye and/or a surfactant. It is important that the additives are fully compatible and wetted by the applied liquid and the composite of the applied liquid/dissolved reactive powder. This is again to ensure there are minimum voids left in the final formed composite: voids will result in weakness and therefore loss of properties such as strength and toughness in the final cured 3D object.

The powder is primarily a thermoplastic material having reactive groups e.g. as described in Kirk Othmer Encyclopaedia of Chemical Technology (Volume 23 "Vinyl Polymers"). Reactive groups can be hydroxy, amino, sulpho, keto, ester, amide, acid, anhydride, acetals. Some solubility in the applied fluid is desirable. Representative materials are polyvinyl acetals, polyvinylacetals (especially partially hydrolysed), poly(methylvinylether) copolymers (e.g. Gantrez type materials), hydroxyfunctionalised polyester powders, epoxy polyester powders, hydroxy and epoxy functionalised acrylic powders and hydroxyethylated polyamines, polytetrahydrofurans (crystallised high molecular weight polymers) with hydroxy or acrylate termination, novolaks, polyacrylic acid, polymethacrylic acid (and copolymers), polymaleic anhydride (including copolymers).

Inorganic or organic particles can be reactively surrounded/treated by monomeric, oligomeric or polymeric compounds which have additional reactive functionality which can participate into reaction with the jetted crosslinkable resin. Preferably, therefore, the diluent in the liquid has reactive groups capable of swelling and/or dissolving the powder.

The curable/polymerising/crosslinkable applied liquids can involve compounds which can undergo condensation reactions with the reactive powder. These reactions can be triggered either by thermosetting reactions such as epoxy/amine or isocyanate/polyol/amine etc., or by electromagnetically triggered cationic systems such as cyclic ether compounds (epoxy, oxetane, cycloaliphatic epoxy etc), cyclic lactones, cyclic acetal compounds, cyclic thioether compounds, spiroorthoester compounds and vinyl compounds, plus cationic photo-initiator salts (e.g. diazonium, sulfonium, iodonium or ferrocenium), or radically cured systems such as acrylates, methacrylates, allyl urethane, urethane acrylates, epoxy-acrylates, unsaturated polyester compounds, plus radical photoinitiators (e.g. acetophenone series, benzion series, benzophenone series, thioxanthone series, phosphine oxides, alkyl triphenyl borates, iodonium salts).

In the thermosetting case, the reactants can be separately included in the liquid and the powder (eg. epoxy in the liquid and amine in the powder or vice versa), such that on jetting, the two components react to form the condensation product. In the electromagnetically triggered case, likewise, the photoinitiators may be present in the jet liquid, or powder, separately or together with the curable resin composition. If together with the curable resin, then the diluent can enable much faster reaction rates to be obtained on application of the jet liquid containing the diluent and the reaction. triggering electromagnetic irradiation. The electromagnetic radiation can be administered imagewise in synchronisation with the liquid jet activation, pixel, line or overall whole layer wise irradiation.

The applied liquids can be epoxy, acrylic, isocyanate, epoxy-acrylates, amino, hydroxy based compositions or hybrid compositions of these components, as neat liquids, diluted liquids or as emulsions in water. Most preferably, the applied reactive liquid composition is fully curable after the fluid has ingressed into the powder. Not only does the liquid preferably dissolve/ingress into the powder, but also into printed regions which are not fully cured. These could be areas in the layer beneath that which is being printed, or adjacent areas within the same layer. This "stitching" will allow stronger bonds between regions with different properties, thus preventing the formation of weak spots and fracture points. Compatibility between the two liquids is important to ensure good stitching between regions e.g. the use of two materials both curing by similar mechanisms. It is desirable that each layer is incompletely cured before printed subsequent layers—use of a proportion of the liquid which cures relatively slowly (e.g. epoxy cationic cure) but which will cure completely without further stimulus will enable this.

In case of electromagnetically activated crosslinking reactions, the liquid may contain electromagnetic sensitive photoinitiator compounds, such that on jetting the liquid, the electromagnetically active, photoinitiator compound releases the crosslinking activator, eg. a radical or acid or base. The applied liquids may contain colloidal or nano-particles of ceramics, organic micro-particles, metals and alloys.

The viscosity of the applied liquid can be from 2 to over 500 cps at room temperature and then have a much lower viscosity at higher operational temperatures. Preferably, the viscosity of the resin composition is low, eg. 2 to 20-30 cps, at room temperature to be compatible with piezojet systems. It has been found that diluents (reactive or not) not only enable the low viscosity to be attained, but also surprisingly help with the intimate curing between the crosslinking fluid and the reactive powder. This effect yields much tougher composites. Most preferably, the viscosity of the applied resin composition is 30 cps or less at 70-100° C.; this resin application gives with suitability chosen reactive powders the optimum ingress into the powder, rise in viscosity and reactivity.

In an alternative system, the first material is a first liquid material which is deposited as a layer, and preferably has a viscosity in the range of 20 to 500 cps at room temperature, but can be greater than 3000 cps and be paste like. This first material may comprise the majority of the ultimately formed layer.

Thus, the two reactive components react on contact to form a solid lamina in the required pattern and this is repeated to form a solid article. It has been found that the system according to the invention allows the formed article to be relatively robust since the active components react chemically to form a new chemical component. Chemical bonds can also form between layers. Transparent articles are readily afforded by this particular aspect of the invention.

The first and second active components may comprise respective mixtures of active compounds, as described with the liquid/powder system. Preferably, the first active component and/or the second liquid substantially comprises the second active component. Preferably the second liquid includes a proportion of the first liquid and/or first active component(s). Preferably, the model is a digital model.

Preferably, as with the liquid/powder system, the second liquid additionally comprises a viscosity lowering diluent in order to achieve the desired viscosity. The effect of the low viscosity of the second liquid is that it enables the second liquid to be jetted out of smaller bore nozzles, without the need to raise the temperature, thereby achieving a superior resolution. Furthermore, better mixing of the first and second liquids will be effected by having the diluent, especially in the case where the first material is paste like. Preferably the diluent is reactive so that all of the applied liquid is incorporated into the first liquid.

As with the liquid/powder system benefits of layer wise build up of objects from a flowable/coatable first liquid include the self support of the forming programmed object by the liquid and furthermore the unused liquid can be reused.

Different liquid formulations maybe used as the second liquid, applied either at different locations on the same layer or on different layers. Conveniently, the liquid is applied using a linear array of nozzles which are passed over the first liquid layer. Thus different liquids can be supplied to different nozzles and/or different liquids can be applied in respective sequential passes, either over the same liquid layer or succeeding layers.

The layerwise construction of the three dimensional object can thus be such that different liquids maybe jetted/sprayed imagewise during each layer construction or in different whole layers or multi-layers, thus affording differing micro and macro properties of strength, toughness and flexibility. Random or repeating programmed patterns may be formed to achieve smooth, void free final properties. Deliberately designed repeating voids maybe formed surrounded by toughened resin matrix to yield complex membranes. Other liquids may be jetted/sprayed over the previous, already jetted areas. Such techniques can be used for example to produce tracks or patterns which have different refractive index from the surrounding area, and thus be used for wave-guiding purposes. The patterns may be disposed flat in one layer or be 3 dimensionally disposed over several layers.

It may also be possible to incorporate an entirely "foreign" body within the structure, for example conducting, semi-conducting or magnetic tracks, or metallic components/devices, or to incorporate a foreign liquid, for example a micro-encapsulated formulation of liquid crystal systems. The conducting, semi-conducting, or magnetic tracks, or metallic components/devices may themselves be produced in situ within the layers using secondary jets dispensing molten or conducting, semi-conducting, or magnetic organic or inorganic materials or compositions. The secondary jets maybe of finer resolution that those forming the macro-layer structure The process may include a further step of irradiating the article. The article may be irradiated pixel by pixel, line by line or layer by layer, and/or after several layers have been formed, and/or after all the layers have been formed. Preferably, electromagnetic radiation is employed. Suitable sources include UV light, microwave radiation, visible light, laser beams, and light emitting diode arrays, and other similar sources. Light management could involve light valve array technologies.

Preferably, the irradiation maybe synchronised to the absorption and reactivity rates of the jet applied liquid onto the layer material. In the powder/liquid case, this may involve the application of the electromagnetic irradiation after the liquid has ingressed into the powder, whereas in the liquid/liquid case, the irradiation may be during the flight of the applied fluid from the jet device to the surface of the deposited fluid layer.

The nozzle system employed is preferably equivalent or identical to that used in inkjet systems, preferably piezo inkjet or spray systems. Preferably, the size of the nozzle openings is the range 10 to 200 μm and/or the size of the applied droplets is in the range 10 to 200 μm, although the nozzle openings may become in future smaller than 1 μm, even as small as a few nanometres, thus allowing correspondingly sized droplets to be applied. Preferably, the process includes the step of varying the number of pixel drops and/or varying the applied liquid per pixel, per line applied and/or per layer, in order to achieve variable properties in the article. Another following jet or spray may cover same previously addressed area [droplet is defined as the diameter of the droplet in flight between the nozzle and receptor]

By combining the compositions with programmable piezo (array) printhead technology, it is possible to vary micro-material properties of the formed object, to achieve strength, texture and variable macro properties required in actual functional 3D objects. As Pixel addressability with piezo printheads can be as high as 20 micron spots, the resulting resolution can match the resolution achievable using laser address systems. This addressability will go even higher with the use of Nanojet technology delivering picoliter volumes of liquid, or less.

In one embodiment, the object remains stationary and two nozzles track across it. However, the nozzles may be held fixed and the object moved. In either case, several objects can be formed simultaneously by forming the layers on respective objects sequentially, by moving the nozzles across the several objects or moving the several objects relative to the nozzles.

Highly precise and complex objects can be fabricated with fine detail. Different fluids/components can be dispensed pixel-wise, line wise and layer wise within these address schemes, with further differentiation possible through clustering in the pixels, lines and layers in a random or configured manner, to provide even more material property variation ranging from flexible, elastic and conformable, to rigid and toughened. In addition to differential material properties (mechanical, and texture), true and accurate colour rendition in the formed object is available by having colourisable or decolourisable reactive powder or the first liquid or by incorporating colourants in the dispensing liquids.

Optical properties may also be varied, for example selective wavelength refractive/transmissive properties can be produced in random or patterned way. Furthermore, the layers can be of different thicknesses, involve different materials (thus varying the refractive index from layer to layer, in a random or patterned way) and each layer can itself be formed with a prescribed topography by varying its thickness over its extent. The topography between and in layers can be patterned, thus achieving optical or mechanical effects. The patterns (optical, electro, or integral electro-optical, or magneto) can be planar (ie. within a layer) or can be 3-dimensionally disclosed circuit within the laminar structure. Areas within an object maybe transparent or opaque. It will also be appreciated that, using the techniques of the present invention, it will be possible to produce so-called "smart" cards which might include an embedded microchip and other features such as a hologram, a photograph (which could be digitally ink-jetted and coloured) or a watermark-like feature (which could be UV fluorescent). The laminar structure and the adhesive nature of the inter-laminar relationship leads to a considerable degree of security.

Typically, the formed layer may be up to 300 μm in thickness, though more commonly they might be up to 200 μm. Thin layers down to 80 μm or 50 μm may be achieved and possibly even thinner layers of 30 μm or 1 μm.

However to achieve these capabilities via the use of the arrays of adjacent nozzle jets, is it is desirable in the first instance to have low viscosity liquids (less than 40 cps with 2-30 cps preferred at ambient temperatures and more preferred at 80-100° C.), which can be jetted at high jet firing frequency preferably 5 to 20 KHz line frequency and preferably 40-100 KHz individual jet frequency). Much higher frequency jetting will be possible in the future, approaching 300 kHz.

It has therefore been found surprisingly that diluents present in the jetting fluid which act to reduce the viscosity of normal polymerisable mixtures from over 40 cps to below 15 cps (a more useful viscosity range), serve the dual purpose of viscosity lowering for jetting and, particularly where powder is issued as the first material, enabling inter and intra powder crosslinking with the jetted polymerisable resin present also in the fluid. The diluent itself can adhere suitable powder particles together (ie. thermosetting or thermoplastic powders) giving coatings or 3D objects with the properties of the bulk polymer/composite making up the powder. This adherence effect probably involves wetting, swelling, and partial dissolving phenomena, such that the powder particles coalesce smoothly without the presence of fracture forming voids.

Most surprisingly however, the diluent also enables polymerising/crosslinkable fluids present in the dispensing liquid fluid to wet and penetrate the powder probably through polymer swelling/partial dissolving actions. Thus, polymerising/crosslinking can take place at the surface of and within the powder, as well as within the jetted fluid residing between the powder particles.

Furthermore, when using powders which have complementary chemistry to the polymerising/crosslinking components in the jetted fluid, effective micro/nano-mixing and reaction can be effected, yielding higher strength composites, without voids which can be initiating sources of fracture failure.

Reactive diluents are preferred as these enable viscosity lowering effects, powder or liquid ingress and subsequent full cure of the jetted liquid. Suitable reactive diluents are low molecular weight liquids (<200), having reactive groups such as hydroxy, amino, epoxy, oxetane, acrylate, vinylether ester. Examples are hydroxymethyloxetane, 1,4-divinyletherbutanediol, 1,4-butane diol, tripropyleneglycol diacrylate.

The situation regarding the deposited layer being a liquid is similar: Typically, the formed layer may be up to 300 μm in thickness, though more commonly they might be up to 200 μm. Thin layers down to 80 μm or 50 μm may be achieved and possibly even thinner layers of 30 μm or 20 μm, or down even to 1.0 μm.

However to achieve these capabilities via the use of the arrays of adjacent nozzle jets, it is desirable in the first instance to have low viscosity fluids (less than 40 cps with 2-30 cps preferred at ambient temperatures), which can be jetted at high jet firing frequency (preferably 10 to 30 KHz line frequency and preferably 40-100 KHz individual jet frequency).

Preferably, diluents are added to the second liquid to reduce the viscosity from over 30 cps to below 15 cps. Reactive diluents are highly preferred as these will become incorporated into the finally formed 3D object, such that there is not present any subsequent vapour emission and/or free liquid.

Preferably, where the first material is a liquid, the first active component comprises resins with ring opening compounds, eg. epoxy, polyepoxy, thiiranes, aziridines, oxetanes, cyclic lactones, cyclic acetals and vinyl-ethers; polymerising compounds such as ethylenic and (metha) acrylate, hydroxyacrylates, urethane acrylates and polyacrylates; hybrid compounds, such as epoxy-acrylates, isocyanurate-epoxy, Epoxy-Silane advanced resins and polyurethane-silanes; siloxanes containing ring opening or polymerising groups; and condensing resins such as isocyanates. The resin may be a hybrid composition of above active components. The resin layers may additionally contain fillers, reactive or not, organic (eg. core shell), inorganic (glass spheres/fibres/flakes, alumina, silica, calcium carbonate etc), pigments, dyes, plasticisers, pore formers etc.

Toughener materials such as those described in U.S. Pat. No. 5,726,216 may be added to the first liquid or introduced selectively via the second fluid in the programmed jetting procedure.

Preferably, the second active component is then a radiation photosensitive radical and/or cationic photoinitiator and/or a catalyst. The active component in the second liquid may comprise nano particles, either directly reactive via surface groups (such as epoxy, acrylic, hydroxy, amino etc) or contained as dispersions in an active component.

The curable/polymerising/crosslinkable liquids can involve compounds which can undergo condensation reactions triggered either by thermosetting reactions such as epoxy/amine types or by electromagnetically released cationic systems such as epoxy plus sulfonium, iodonium, ferrocenium salts, or radical systems such as acrylates plus radical photoinitiators eg. Acetophenone, benzophenone, thioxanthone, alkylborates, iodonium salts etc. In the thermosetting case, the reactants can be separately included in the two liquids such that on jetting, the two components react to form the condensation product. In the electromagnetic case, the electromagnetic radiation can be administered imagewise in synchronisation with the liquid jet activation, pixel, line or overall whole layer wise irradiation. Initiators comprising two components, one component in each fluid, may also be employed such that on jetting the active initiating species is formed.

The active components can be epoxy, acrylic, amino, hydroxy based compositions, as neat liquids, diluted liquids or as emulsions in water. In case of electromagnetically activated crosslinking reactions, the second liquid may contain electromagnetic sensitive compounds, such that on jetting the second liquid, the electromagnetically active compound releases the crosslinking activator, eg. a radical or acid or base.

One or both liquids may contain nanoparticles. The nanoparticles can be reactive or not, organic (from micro-emulsions), organo-metallic, ceramic, colloidal metallic/allow, and may be stabilised suspensions in the resin of choice.

The viscosity of the first liquid can be from 30 to over 30,000 cps at room temperature and then, with higher viscosity liquids, have a much lower viscosity at higher operational temperatures. The lower viscosity at higher temperature may be utilised for faster recoating of the layers of the first liquid making up the final 3-D product, as well as to remove the unused first liquid.

Preferably, the viscosity of the second liquid composition is low, eg. 2 to 20-30 cps, at room temperature to be compatible with current array piezojet systems. A viscosity less than 30 cps at 80-100° C. is more preferable. More preferably, the viscosity is 10-20 cps as a reasonable balance of fast jetting/ spraying piezo action, combined with good resolution. Too low a viscosity can lead to loss of resolution due to excessive image spread.

Thus catalysts (eg. initiators for condensing or crosslinking or polymerising) dissolved or dispersed in the reactive low viscosity second fluid maybe jetted onto resin compositions (layer viscosity ranging between 30 to more than 30,000 cps) of the first liquid to cause pixel wise condensation of the resin.

A higher viscosity for the second liquid (ie. greater than 500 cps at room temperature) may be useful for jetting paste-like droplets on and into the first liquid such that the paste droplet becomes a toughening additive in the resin layer. The paste may be reactive or not. Similarly for example, molten metallic or organic conducting or semi-conducting polymers may be directly jetted onto/into the first liquid.

Simultaneous electromagnetic irradiation may be used in case of using photo-active catalysts. Viscosity lowering in this case is achieved by using low viscosity reactive components (eg. oxetanes such as UVR6000 from UCB) and diluents (eg. polyols), which can furthermore participate in the photo-catalysed polymerisation/condensation reaction. Alcohols aid efficient photolysis of cationic ions used for cationic polymerisation of epoxy compounds.

Most surprisingly, it has been found that small amounts of first active component or liquid present in the jetted low viscosity second liquid, for those systems with simultaneous electromagnetic irradiation, greatly aids control of the reaction. It is believed that this is due to improved surface tension matching between the jetted fluid and the liquid layer, as well as a more rapid and higher incorporation, with resolution, of the jetted catalyst into the first liquid layer.

The jetted liquid can be jetted or micro-sprayed. Two or more liquids may be jetted or sprayed simultaneously from adjacent jetting or spraying printheads such that the liquids combine either in flight or on the surface of the first liquid. This process is particularly useful for jetting/spraying traditional two component adhesive resin mixtures, which have to be held separately until in use.

In the case of a liquid/powder system, preferably, the diluent is present in the range 30 to 60% by volume, more preferably to 30 to 40. Preferably, the reactive component represents 30 to 80% of the powder, more preferably 50 to 70%. Preferably, the thickness of the powder layers is in the range 200 to 5 μm, more preferably 150 to 20 μm. It is appreciated that these are scaleable properties depending on powder size, number of reactive sites, eg. hydroxy or amino number and swelling characteristics of the powder on addition of the diluent/curable fluid resin.

There are various ways in which the powder layers can be built up. For example, powder material can be supplied to an enclosure and the article is formed on a platform within the enclosure. As each successive layer is formed, the platform is lowered into the enclosure and so a fresh supply of powder is placed on the previous layer. The powder can then be levelled off to the required thickness, eg. by a blade. In this way, the article is supported by the powder while it is being formed. Alternatively the powder layer is deposited from a hopper delivery system in a layerwise fashion over the previous layer.

After 3 dimensional construction, the excess powder is removed, and the part is preferably further post-cured, either thermally or by using electromagnetic irradiation (eg. UV, visible, infra red, microwave etc).

In the case of a liquid/liquid system, preferably, any diluent in the second liquid is present in the range 20 to 50% by volume, more preferably to 20 to 30%. Preferably the thickness of the first liquid layer is in the range 0.1 to 200 μm, more preferably 0.1 to 100 μm.

In one preferred system, the first liquid is contained within an enclosure and the article is formed on a platform within the enclosure. As each successive layer is formed, the platform is lowered into the enclosure and so into the supply of the first liquid. In this way, the article is supported by the first liquid while it is being formed. After a lamina has been formed in the required pattern, the platform may be lowered to a significantly lower level within the first liquid and then raised to the required level, thereby picking up a quantity of the first liquid. The first liquid can then either be levelled off to the required thickness, eg. by a blade, or may be allowed to find its own level and thickness. Alternatively, the first liquid is applied via a recoater bar, in a layerwise fashion over the previous layer.

After 3 dimensional construction, the excess liquid is drained off, and the part is preferably post-cured, either thermally or by using electromagnetic irradiation (eg. UV, visible, infra red, microwave etc).

The process lends itself very conveniently to the production of articles from a digital representation held by a computer, and is particularly suitable for use with CAD systems. Thus, an article can be designed using CAD software, the digital information can be converted to a series of laminae in digital form and the digital representation of the laminae can be used to control the delivery of the applied liquid sequentially on to successive layers of the deposited material (powder or liquid/paste), in order to reproduce the article in 3-dimensions. The techniques can be used for rapid prototyping and even rapid manufacture.

The produced object can be used as an actual technically functional part or be used to provide a proof of the CAD files before actual production. The technique is also suitable for in-line production use as layered encapsulates in the electronics field, or for production of printed optics, either individually or as part of a pattern disposed within a layered structure. The technique may also be useful in forming multi-layer structured films with polarising optical or wave guiding effects.

It will be appreciated that by using the techniques of the present invention, it is possible to build up three dimensional articles in the form of laminated blocks or items with complex shapes. By varying the characteristics across the layers including layer thickness, as they are formed, optionally on a micro-scale, it is possible to instil at least a functionality in the finished article. This functionality can take many forms, examples of which include electronic circuits and optical components. In the case of electronic circuits, the techniques of the invention offer a method of producing intricate circuits of microscopic size. Preformed circuits can be embedded in the layers. In the case of optical components, the invention enables the optical properties of a component to be varied layer by layer and across each layer, and each layer can be of varying thickness and refractive index, thereby enabling complex optical multi-layer films to be produced.

Complex layer structured articles may be realised, having integrated complex shapes with laminar film blocks having optical, electro-optical, magnetic etc patterns, as well as macro-mechanical, colour and texture properties.

It is also possible to build the component on to a substrate which is then retained as part of the final finished article. Such a substrate might be a glass or a plastics sheet which could for example form part of an optical component.

The invention may be carried into practice in various ways and some embodiments will now be described by way of illustration in the following Examples.

EXAMPLES

| Material | Supplier | Description |
|---|---|---|
| Uvacure 1500 | UCB | Difunctional cycloaliphatic epoxy |
| Heloxy 48 | Shell Chemicals | Trifunctional glycidyl epoxy |
| Glycerol propoxylate triglycidyl ether | Aldrich | Trifunctional glycidyl epoxy |
| Terathane 1000 | Aldrich | Poly(THF) |
| Cyracure UVI6974 | UCB | Cationic photoinitiator |
| Irgacure 184 | Ciba Specialty Polymers | Free-radical photoinitiator |
| Ebecryl 3700 | Rahn | Difunctional epoxy acrylate |
| SR306 | Cray Valley | Difunctional acrylate |
| SR399 | Cray Valley | Pentafunctional epoxy acrylate |
| Ebecryl 4858 | Rahn | Difunctional urethane acrylate |
| Ebecryl 1160 | Rahn | Ethoxylated TMPTA |
| Genomer 3364 | Rahn | Trifunctional acrylate |
| Genomer 3456 | Rahn | Tetrafunctional acrylate |
| Speedcure DMB | Lambson | Amine synergist |
| Highlink OG101.31 | Clariant | Silica organosol in difunctional acrylate |
| Photomer 5429F | Cognis | Tetrafunctional polyester acrylate |
| CL1039 | UCB | Difunctional urethane acrylate |
| Irgacure 819 | Ciba Specialty Polymers | Free-radical photoinitiator |
| Isodecyl aclylate | Cray Valley | Monofunctional acrylate |
| Isobornyl acrylate | Cray Valley | Monofunctional acrylate |
| TMPO | Perstorp Specialty Chemicals | 3-Ethyl-3-(hydroxymethyl)oxetane |
| Oracet Blue | Ciba Specialty Chemicals | Blue dye |
| BDMA | Aldrich | Benzyl dimethylamine |
| BD600E | Atofina | Epoxidised butadiene diol |
| Butvar B76 | Solutia | Poly(vinyl butyral) |
| UVR6105 | UCB | Cycloaliphatic epoxy |
| UVR6000 | UCB | 3-ethyl-3-(hydroxymethyl) oxetane |
| UVI6976 | UCB | Cationic photoinitiator |
| HPA | Aldrich | Hydroxypropyarylate |

Example 1

Alternating Fluid Layers Deposited onto Powder

This example demonstrates the variability of applied fluid, layer by layer, onto deposited powder. A three layer composite is produced, where layers 1 & 3 are a composite of a polyvinyl acetal powder and a cationically curable fluid comprising oxetane ring opening compound, and layer 2 is a composite of the polyvinyl acetal powder and a radically cured acrylate fluid. The three layers are firmly bonded within and between the layers. The acrylate layer 2 is blue and transparent, whereas the layers 1 & 3 are opaque and white.

|  | Jet Fluid A | Jet Fluid B |
|---|---|---|
| TMPO | 95 |  |
| UVI 6974 | 5 |  |
| Ebecryl 4858 |  | 13.7 |
| Ebecryl 1160 |  | 4 |
| Isodecyl acrylate |  | 12.1 |
| CL1039 |  | 26.6 |
| SR306 |  | 20.2 |
| Irgacure 819 |  | 0.8 |
| Irgacure 184 |  | 6.5 |
| Butan-2-one |  | 16.1 |
| Oracet blue |  | Trace |
| Fluid Viscosity cps | 22 | 25 |

Step 1. A layer (1000 μm) of Butvar B76 powder (ground to <80 μm) was spread on a metal sheet mounted on an XY stage. Oxetane Fluid A was jetted onto the powder from a Siemens printhead (supplied by Euromark) by moving the substrate at 0.2 cms$^{-1}$ in a strip approx 3 cm long and 3 mm wide. This was then placed under a UV lamp (4 W) for 3 mins to cure the fluid.

Step 2. A layer (400 μm) of B76 was spread over the previous powder layer. In a manner similar to that in Step 1, acrylate Fluid B was jetted on top of the previous cured strip. This was then placed under a UV lamp (4 W) for 3 mins to cure the acrylate fluid/powder composite giving a blue layer.

Step 3. Step 2 was repeated, but using oxetane Fluid A. The article was removed from the powder and cured at 100° C. for 15 mins.

The final article, 1 mm thick, consists of three layers, layers 1 and 3 being of the same material and white, layer 2 being blue and of different chemical constituents. Observation with an optical microscope of a section through the sample clearly shows the layered nature of the sample.

Example 2

Initiator Jetted onto Alternating Liquid Resin Layers

An article consisting of three alternating layers was constructed by the jetting of a low viscosity photoinitiator composition on to alternating layers of a deposited liquid resin.

Composition of Fluids (Mass %):

|  | Resin A Epoxy-Acrylate Hybrid Resin | Resin B Epoxy-Acrylate Hybrid Resin | Fluid C Hybrid Photo-Initiator Fluid |
|---|---|---|---|
| Uvacure 1500 | 52.1 | 52.2 |  |
| Heloxy 48 | 11.8 |  |  |
| Glycerol Propoxylate Triglycidyl Ether | 6.6 |  |  |
| Terathane 1000 | 16.1 |  |  |
| Ebecryl 3700 | 6.8 | 6.8 |  |
| SR399 | 6.6 | 6.6 |  |
| UVI 6974 |  |  | 20 |
| Irgacure 184 |  |  | 8 |
| BD600E |  | 34.5 |  |
| TMPO |  |  | 72 |

Step 1. A layer (1.0 g, 600μm thick) of Resin A was placed in a shallow dish 55 mm diameter. In a manner similar to that in Example 1, photo-initiator fluid C was jetted onto the resin, with the substrate moving at a speed of 2.4 cms$^{-1}$. The sample was then placed under a UV lamp (4 W) for 3 mins to cure the fluid.

Step 2. A layer (0.2 g) of Resin B was spread over the previous layer and cured strip and fluid C. was again jetted over the previously cured strip in an identical manner. The sample was again cured under UV.

Step 3. A layer (0.2 g) of Resin A was spread over the previous layer and the jetting a cure sequence repeated.

The sample was removed from the uncured layer, excess resin wiped off and the article cured under flood UV for 1 hr to give a strip 350 µm thick, consisting of three alternating layers.

Example 3

Encapsulation of LED by Jetting Initiator Composition onto Fluid Layer

An LED was encapsulated in an laminar article of cured resin by building the cured resin up around the LED in layers by the application of a photoinitiator composition to a liquid resin composition in the following manner.

Step 1. Resin A (1.0 g) was sprayed into a mould 5 cm×10 cm to give an even layer of resin (approx 200 µm thick). As in previous examples, the initiator composition in the form of Fluid C was jetted on to the deposited resin layer, using a Siemens printhead with the resin substrate moving at 2 cms$^{-1}$. The resin layer was cured under UV, only in the areas applied with the initiator composition.

Step 2. Resin A (0.25 g) was sprayed using an airbrush on top of the previous layer, and the jetting and cure procedure repeated. A light emitting diode 'LED' (RS Components, plastics case reduced in thickness to 900 µm by filing down the plastics material) was placed flat on top of the cured resin.

Step 3. Resin A (0.25 g) was sprayed on top of the previous layer, excess resin was wiped from the top of any protruding portions of the LED, and the jetting and cure procedure repeated.

Step 4. Step 3 is repeated until the LED is completely encapsulated in solid resin. This required deposition and curing with applied initiator composition of 15 layers in total.

Step 5. The article is removed from the uncured resin, excess resin wiped off and the article cured under flood UV for 1 hr. On connecting a 3V power supply to the protruding contacts of the LED, the LED was observed to emit light.

Thus an electrical component is incorporated into a layered article by repeated application of a photoinitiator composition to layers of liquid resin.

Example 4

Detailed Patterns by Jetting Initiator onto Liquid Resin Layers

This example demonstrates the production of a pattern using the deposited resin layer cured by programmed application of a photo-initiator composition. The resultant patterning principle demonstrated indicates ability to form solid patterns or programmed voids within a layered article.

Composition of Fluid (Mass %)

|  | Resin D |
| --- | --- |
| Uvacure 1500 | 52.1 |
| Heloxy 48 | 11.8 |
| Glycerol Propoxylate | 6.6 |

-continued

|  | Resin D |
| --- | --- |
| Triglycidyl Ether Terathane 1000 | 16.1 |
| Ebecryl 3700 | 6.8 |
| SR399 | 6.6 |

Step 1. Resin D (0.10 g) is spread evenly on a glass slide 2.5 cm×7.5 cm

Step 2. Fluid C is jetted onto the resin in a pattern giving the letters "VANTICO", with the substrate moved at a speed of 2 cms$^{-1}$. The pattern is then cured for 3 mins under a 4 W UV lamp.

Step 3. Excess resin is wiped from the slide and the slide rinsed with tri(propylene glycol) methyl ether leaving the letters "VANTICO" formed from cured resin adhered to the slide.

Thus detailed and porous articles can be made by jetting photoinitiator onto curable resin.

Example 5

Encapsulation of LED and Fibre Optics by Jetting Initiator onto Fluid

A LED and fibre optics were encapsulated in a laminar article of cured resin by building the cured resin up around the embedded articles by the application of a photoinitiator composition to a liquid resin composition in the following manner.

Composition of Fluids (Mass %):

|  | Resin E | Fluid D |
| --- | --- | --- |
| Uvacure 1500 | 50 |  |
| Photomer 5429F | 30 |  |
| Highlink OG101.31 | 20 |  |
| UVI 6974 |  | 50 |
| Irgacure 184 |  | 20 |
| TMPO |  | 30 |

Step 1. Resin A (1.0 g) was placed into a mould 10 cm×10 cm and spread to give an even layer of resin (approx 100 µm thick). As in previous examples initiator in the form of Fluid D was jetted on to the resin using a Siemens printhead in a line 8 cm long with the substrate moving at 2 cms$^{-1}$. The resin layer was cured under UV, only in the areas applied with the initiator composition.

Step 2. Resin A (0.5 g) was spread on top of the previous layer, and the jetting and cure procedure repeated. This was repeated to give a total of three layers of cured resin.

Step 3. Fibre optic A (400 µm diameter, 5 cm long) was placed on the cured resin such that a length of the fibre (2 cm) protruded beyond the end of the cured strip.

Step 4. Resin A (0.5 g) was spread on top of the previous layer and the jetting and cure procedure repeated.

Step 5. Step 4 was repeated twice until the fibre optic was completely encapsulated in cured resin.

Step 6. Uncured resin was removed from the mould and replaced by Resin E to bring the level of the liquid up to the previous level of Resin A.

Step 7. Resin E (0.5 g) was spread on top of the previous layer and the jetting and cure procedure repeated.

Step 8. Resin E (0.5 g) was spread over the top of the previous layer and an LED (reduced by filing to a thickness of 900 μm) placed on the surface of the cured resin, and fibre optic B (400 μm diameter, 5 cm long) placed on the surface of the cured resin such that one end touches the LED and the other end extends beyond the end of the cured portion of resin. The jetting and cure procedure are repeated.

Step 9. Resin E (0.5 g) was spread over the surface of the previous layer, excess resin wiped from the surface of the LED, and the jetting and cure procedure repeated.

Step 10. Step 9 was repeated until the LED and fibre optic are completely encapsulated in cured resin. This required deposition and curing with applied initiator composition of 15 layers in total.

Step 11. The article is removed from the uncured resin, excess resin wiped off and the article cured under flood UV for 90 mins.

The final article (1.2 mm thick, 1 cm wide, 8 cm long) consists of a base of opaque cured resin, in which fibre optic A is embedded. A second layer of transparent cured resin encapsulates an LED and fibre optic B. On connecting a 3V power supply to the protruding contacts of the LED, the LED was observed to emit yellow light, some of which was seen to be transmitted through fibre optic B, but none through fibre optic A.

Example 6

Alternating Liquids in Same Layer of Deposited Powder

This example demonstrates the variability of applied fluids onto same layer of deposited powder. A two layer article is produced, where each layer consists of two parts. Part 1 is a composite of a polyvinyl acetal powder and a cationically curable epoxy based fluid (E), and part 2 is a composite of the polyvinyl acetal powder and a radically curable acrylate fluid (F).

|  | Jet Fluid E | Jet Fluid F |
| --- | --- | --- |
| TMPO | 80 |  |
| Uvacure 1500 | 10 |  |
| UVI 6974 | 5 |  |
| Butan-2-one | 5 |  |
| SR306 |  | 74 |
| Genomer 3364 |  | 10 |
| Genomer 3456 |  | 10 |
| Speedcure DMB |  | 5 |
| Benzophenone |  | 1 |

Step 1. A layer (500 μm) of Butvar B76 powder (ground to <80 μm) was spread on a metal sheet by rolling technique, which was then mounted on an XYZ stage. Fluid A was jetted onto the powder from a Siemens printhead at a speed of 0.1 cms$^{-1}$. The fluid-jetted strip is about 4 cm long and 3 mm wide. A small gap appeared between this strip and surround powders due to shrinking of the mixture of powder and fluid. The specimen was then placed under a UV lamp (4 W) for 4 mins to cure the fluid.

Step 2. A very thin powder layer (50 μm) was spread over the previous layer in order to fill the gap between strip and powders. After that, Fluid B was jetted onto the powder layer, starting from an end of the existing strip netted with Fluid A). A slight overlap is preferred to enhance the joining of the two strips. The rest is the same process as described in Step 1.

Step 3. Another powder layer (300 μm) was deposited over the previous layer. Fluids A and B were jetted onto powder layer, respectively. In this stage, no clear gap can be seen between fluid-jetted strip. It is likely that the powders deposited on the previous fluid-jetted layer are less removable. The formed layer was cured by the UV lamp for 4 mins, and then was removed from the powder and thermally cured at 60° C. for 20 mins.

The final article, 60 μm thick and 8 cm long, consists of two layers and each layer is made of two parts composed of the same powder but with different fluid. Consequently, different mechanical properties are observed between these two parts; one with Fluid A is more rigid than that with Fluid B.

Example 7

Multiple Jet Liquids Applied to a Common Powder to give Single Item with Distinct Regions of Different Mechanical Properties Liquid Formulation (Expressed as % Mass):

|  | G | H |
| --- | --- | --- |
| Uvacure 1500 | 50 | 25 |
| TMPO | 45 | 45 |
| TOP 90 |  | 25 |
| UV16974 | 5 | 5 |

Step 1. A layer of Mowital B60T (500 μm) was spread on a metal plate, which was placed on an X-Y stage, housed in Jetlab equipment from MicroFab Technologies Ltd, Texas, USA.

Step 2. Resin G was jetted onto the powder using a Microfab 50 μm single jet head heated to 70° C., in a pattern consisting of lines spaced laterally by 250 μm, at a droplet density of 300 drops/mm. The pattern, consisting of two squares (sides 20 mm, 10 mm apart, shown below) was then cured by exposure to UV light (4 W, UVA, 120 mJ/cm$^2$).

Step 3. A further layer of powder (300 μm) was spread over the previous layer, and step 2 was repeated.

Step 4. A further layer of powder (300 μm) was spread over the previous layer, and step 2 was repeated without the UV cure.

Step 5. Resin H was jetted onto the powder using the same printhead, heated to 70° C., in a pattern consisting of lines spaced laterally by 250 μm, at a droplet density of 300 drops/mm. The pattern, consisting of two rectangles (width 5 mm, length 18 mm, bridging the two previously printed squares) was then cured by exposure to UV light (4 W, UVA, 120 mJ/cm$^2$).

Step 6. A further layer of powder (300 μm) was spread over the previous layer, and step 5 was repeated.

Step 7. Step 6 was repeated.

Step 8. The part was removed from the loose powder.

Areas produced from liquid resin G were rigid while the areas produced from liquid H were very flexible, producing an effective hinge. Both regions were transparent due to dissolution of the powder. The application of multiple liquids to a single layer of powder (as occurs in layer 4) provides good bonding between areas made from different liquids. Despite the use of a common powder, the material properties of the two areas differ greatly.

Example 8 and 9

Variation of Printing Patterns with Two Liquids
(Alternating Layers and Interlaced Lines)

|  | I | J | K |
|---|---|---|---|
| UVR6105 | 50 | 25 | 37.5 |
| UVR6000 | 45 | 45 | 45 |
| UVI6976 | 5 | 5 | 5 |
| HPA |  | 23 | 11.5 |
| Irg184 |  | 2 | 1 |

Tensile test bars (80 mm×10 mm) were built using the method described in Example 7, being made from 6 layers of powder (Mowital B60T) using two different liquids in the same part. Liquid I was used at a printing density of 300 drops/mm. Liquid J having larger droplets was used at a printing density of 175 drops/mm. Thus the same quantity of liquid per unit area was used for each liquid. Liquid J alone produced very flexible parts which were difficult to build with good quality due to a curling of layers.

Two types of sample were prepared. Example 8 consisted of layers produced by alternating using liquid I and liquid J. Example 9 was prepared by printing lines within each layer alternately from liquid I and liquid J and arranging the layers so that the lines also alternated vertically. A comparative example was prepared using liquid K (a 1:1 blend of I and J) for all layers.

Tensile test results: (carried out by preparing test samples to ISO 527-11(1993) and testing using Stable Micro Systems TA-HDi Texture Analyser, test speed 0.08 mm/s, grip distance 55 mm).

|  | Tensile strength/MPa | Tensile Modulus/MPa | Elongation at break 1% |
|---|---|---|---|
| Example 8 | 38 | 1440 | 4.3 |
| Example 9 | 28.9 | 1200 | 4.7 |
| Comparative example 1 | 24.9 | 997 | 20.1 |

Comparative example 1 has a lower strength and modulus than either Example 8 or 9. The presence of liquid I in Examples 8 and 9, which produces rigid parts, gives rise to less flexible parts, but retains flexible regions that could modify impact resistance etc.

Thus printing two liquids in different patterns produces very different results than a blend of the two liquids. The pattern used also influences the overall properties of the part. This allows certain volumes of the part to be built using materials that would be unsuitable for building the entire part.

The invention claimed is:

1. A process for forming a three-dimensional article in sequential layers in accordance with a model of the article, the process comprising the steps of: defining a layer of a first material; applying a second material in the form of a liquid reagent to the layer of the first material in a pattern corresponding to the model; and repeating these steps to form successive layers; and in which the deposited layer comprises a first reactive component and the applied liquid material includes a reactive diluent having a reactive group selected from an oxetane and a second active component capable of either reacting with the first reactive component or facilitating the first reactive component to react with itself, whereby the article is built up in layers; and in which the characteristics of at least some of the layers vary across those layers and/or the properties vary from layer to layer and in which the article formed by the sequential layers is substantially void free, apart from voids programmed in the model and wherein the first material is a thermoplastic powder and the whole of the applied liquid material is incorporated with the thermoplastic powder.

2. A process as claimed in claim 1, in which the applied liquid material is a filly curable resin.

3. A process as claimed in claim 2, in which the powder substantially comprises the first reactive component.

4. A process as claimed in claim 1, in which the diluent is present in the range 30-60% by volume.

5. A process as claimed in claim 1, in which the powder and/or the applied liquid contains an organic or inorganic filler, a pigment, nanoparticles, a dye and/or a surfactant.

6. A process as claimed in claim 2, in which the thickness of the applied powder layers is in the range 1 to 1000 μm.

7. A process as claimed in claim 2, in which the applied liquid material includes a proportion of the first reactive component in the first material.

8. A process as claimed in claim 1, in which the second active component represents 1 to 80% of the applied liquid material.

9. A process as claimed in claim 1, in which the applied liquid material is coloured.

10. A process as claimed in claim 1, in which the applied liquid material contains colloidal or nano-particles.

11. A process as claimed in claim 1, in which the viscosity of the applied liquid material is in the range of 2 to 500 cps at room temperature.

12. A process as claimed in claim 1, in which the second active component acts as a catalyst to facilitate cross-linking of the first reactive component.

13. A process as claimed in claim 1, in which the applied liquid material is deployed through a plurality of nozzles.

14. A process as claimed in claim 13, in which the nozzles form part of an inkjet printer or a device including a set of nozzles generally equivalent to an inkjet print head.

15. A process as claimed in claim 14, in which the nozzles operate on the principles of piezo inkjet technology.

16. A process as claimed in claim 13, in which the size of the nozzle openings is in the range 10 to 200 μm and/or the size of the applied droplets is in the range 10 to 200 μm.

17. A process as claimed in claim 1, in which the size of the nozzle openings is in the range of 0.1 to 200 μm and/or the sizes of the applied droplets is in the range 0.1 to 200 μm.

18. A process as claimed in claim 1, in which the applied liquid material has a viscosity in the range 2 to 30 cps at ambient temperatures.

19. A process as claimed in claim 1, further including the step of irradiating the article.

20. A process as claimed in claim 19, in which the article is irradiated, pixel by pixel, line by line or layer by layer, either randomly or clustered.

21. A process as claimed in claim 19, in which the article is irradiated after several layers have been formed.

22. A process as claimed in claim 19, in which the article is irradiated after all the layers have been formed.

23. A process as claimed in claim 19, in which the irradiating step employs electromagnetic radiation.

24. A process as claimed in claim 19, in which the irradiating step employs UV radiation.

25. A process as claimed in claim 1, in which the model is a digital model.

26. A process as claimed in claim 1, in which the first and/or second material comprise respective mixtures of the first reactive and second active components.

27. A process as claimed in claim 1, in which the thickness of the formed layer is from 30 μm to 200 μm.

28. A process as claimed in claim 1, in which a plurality of different liquids is applied to respective deposited layers of the first material.

29. A process as claimed in claim 1, in which a plurality of different liquids is applied to a single deposited layer of the first material, in the same or different locations.

30. A process as claimed in claim 29, in which the different liquids are applied in a single pass.

31. A process as claimed in claim 29, in which the different liquids are applied in respective sequential passes.

32. A process as claimed in claim 1, in which at least one of the deposited layers comprises a different material.

33. A process as claimed in claim 1, in which the layers formed have differing thicknesses.

34. A process as claimed in claim 1, in which a layer is formed with a varying thickness over its extent.

35. A process as claimed in claim 1, including the step of varying the number of pixel drops and/or varying the applied liquid per pixel, per line applied and/or per layer, in order to achieve variable properties in the article.

36. A process as claimed in claim 10, wherein the colloidal or nano-particles are selected from the group consisting of silica, organic core-shells (made from micro-emulsions), metals or alloys.

* * * * *

UNITED STATES PATENT AND TRADEMARK OFFICE
CERTIFICATE OF CORRECTION

PATENT NO. : 7,578,958 B2 Page 1 of 1
APPLICATION NO. : 10/479303
DATED : August 25, 2009
INVENTOR(S) : Patel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

Signed and Sealed this

Fourteenth Day of September, 2010

David J. Kappos
*Director of the United States Patent and Trademark Office*